United States Patent
Fleischer et al.

(10) Patent No.: US 9,679,360 B2
(45) Date of Patent: Jun. 13, 2017

(54) HIGH-RESOLUTION LIGHT-FIELD IMAGING

(71) Applicant: Trustees of Princeton University, Princeton, NJ (US)

(72) Inventors: Jason W. Fleischer, Princeton, NJ (US); Chien-Hung Lu, Princeton, NJ (US); Stefan Muenzel, Princeton, NJ (US)

(73) Assignee: Trustees Of Princeton University, Princeton, NJ (US)

( * ) Notice: Subject to any disclaimer, the term of this patent is extended or adjusted under 35 U.S.C. 154(b) by 19 days.

(21) Appl. No.: 14/274,600

(22) Filed: May 9, 2014

(65) Prior Publication Data
US 2014/0334745 A1 Nov. 13, 2014

Related U.S. Application Data

(60) Provisional application No. 61/822,026, filed on May 10, 2013.

(51) Int. Cl.
*G06K 9/36* (2006.01)
*G06T 3/40* (2006.01)
*G01J 9/00* (2006.01)

(52) U.S. Cl.
CPC ............. *G06T 3/4061* (2013.01); *G01J 9/00* (2013.01); *G01J 2009/002* (2013.01)

(58) Field of Classification Search
CPC ..... G01J 2009/002; G01J 9/00; G06T 3/4061; G06T 2207/10052; G06T 2207/20221; G06T 5/50
See application file for complete search history.

(56) References Cited

U.S. PATENT DOCUMENTS

| | | | |
|---|---|---|---|
| 7,787,112 B2 * | 8/2010 | Rahn ................. | G01N 21/4795 356/213 |
| 7,872,796 B2 | 1/2011 | Georgiev | |
| 7,949,252 B1 | 5/2011 | Georgiev | |
| 8,189,065 B2 * | 5/2012 | Georgiev ............... | G03B 15/00 348/222.1 |
| 8,244,058 B1 * | 8/2012 | Intwala .................... | G06T 5/10 382/275 |
| 8,290,358 B1 * | 10/2012 | Georgiev ............... | G03B 35/10 396/326 |
| 8,988,317 B1 * | 3/2015 | Liang ...................... | G06T 15/00 345/32 |
| 9,042,667 B2 * | 5/2015 | Venkataraman ......... | G06T 9/00 382/233 |

(Continued)

OTHER PUBLICATIONS

F. Perez, A. Perez, M. Rodriguez and E. Magdaleno, "Fourier Slice Super-resolution in Plenoptic Cameras", ICCP, 2012.*

(Continued)

*Primary Examiner* — Andrew W Johns
*Assistant Examiner* — Ian Lemieux
(74) *Attorney, Agent, or Firm* — Knobbe, Martens, Olson & Bear, LLP

(57) ABSTRACT

A relatively high-resolution image from a conventional camera can be computationally combined with a relatively low-resolution wavefront measurement from, for example, a Shack-Hartmann sensor in order to construct a relatively high-resolution light-field image.

36 Claims, 11 Drawing Sheets

(56) References Cited

U.S. PATENT DOCUMENTS

| | | | | |
|---|---|---|---|---|
| 2011/0116067 | A1* | 5/2011 | Ye | G03F 7/70091 355/67 |
| 2014/0028878 | A1* | 1/2014 | Basavaraja | H04N 5/23232 348/239 |
| 2014/0267674 | A1* | 9/2014 | Mertz | G01J 9/00 348/79 |
| 2015/0116526 | A1* | 4/2015 | Meng | H04N 5/23232 348/218.1 |
| 2015/0297076 | A1* | 10/2015 | Cremer | A61B 3/0008 351/206 |

OTHER PUBLICATIONS

T.E. Bishop, S. Zanetti and P. Favaro, "Light Field Superresolution", Proc. IEEE Int'l Conf. Computational Photograph, Apr. 2009.*

Bishop, Tom E., et al., "Light Field Superresolution", Computational Photography (ICCP), 2009 IEEE International Conference on.

Levoy, M., et al., "Light Field Microscopy", ACM Transactions on Graphics 25(3), Proc. SIGGRAPH (2006).

Lindlein, N., et al., "Algorithm for Expanding the Dynamic range of a Shack-Hartmann Sensor by Using a Spatial Light Modulator Array", Opt. Eng. 40, 837 (2001).

Ng, R., et al., "Light Field Photography with a Hand-Held Plenoptic Camera", Stanford University Computer Science Tech Report CSTR Feb. 2005, Apr. 2005.

Perez, F., et al., "Fourier Slice Super-resolutions in Plenoptic Cameras", Computational Photography (ICCP), 2012 IEEE International Conference on.

Schafer, B., et al., "Determination of Beam Parameters and Coherence Properties of Laser Radiation by Use of an Extended Hartmann-Shack Wave-Front Sensor", Appl. Opt. 41, 2809 (2002).

Waller, L., et al., "Transport of Intensity Phase-Amplitude Imaging with Higher Order Intensity Derivatives", Opt. Express 18, 12552 (2010).

Waller, L., et al., "Phase-Space Measurement and Coherence Synthesis of Optical Beams", Nature Phot. 6, 474 (2012).

* cited by examiner

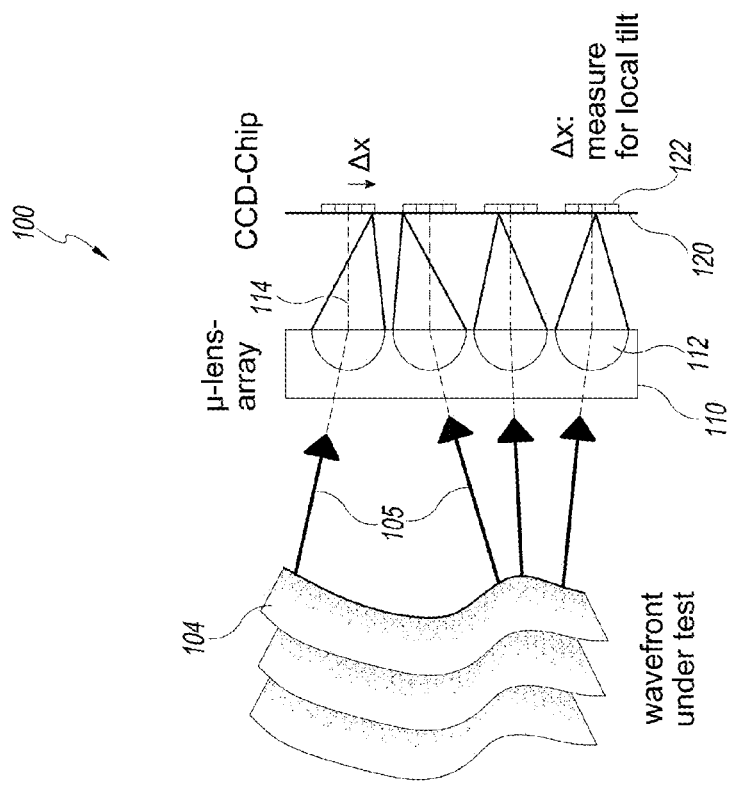
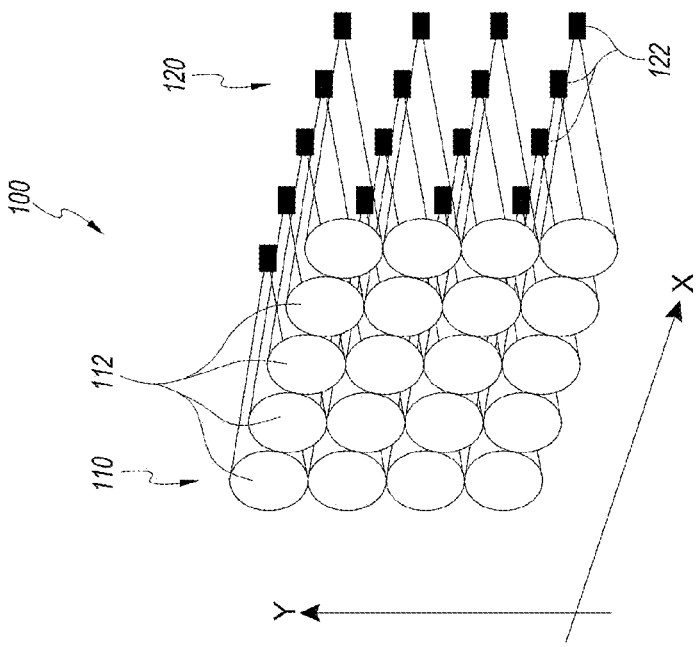
FIG. 1

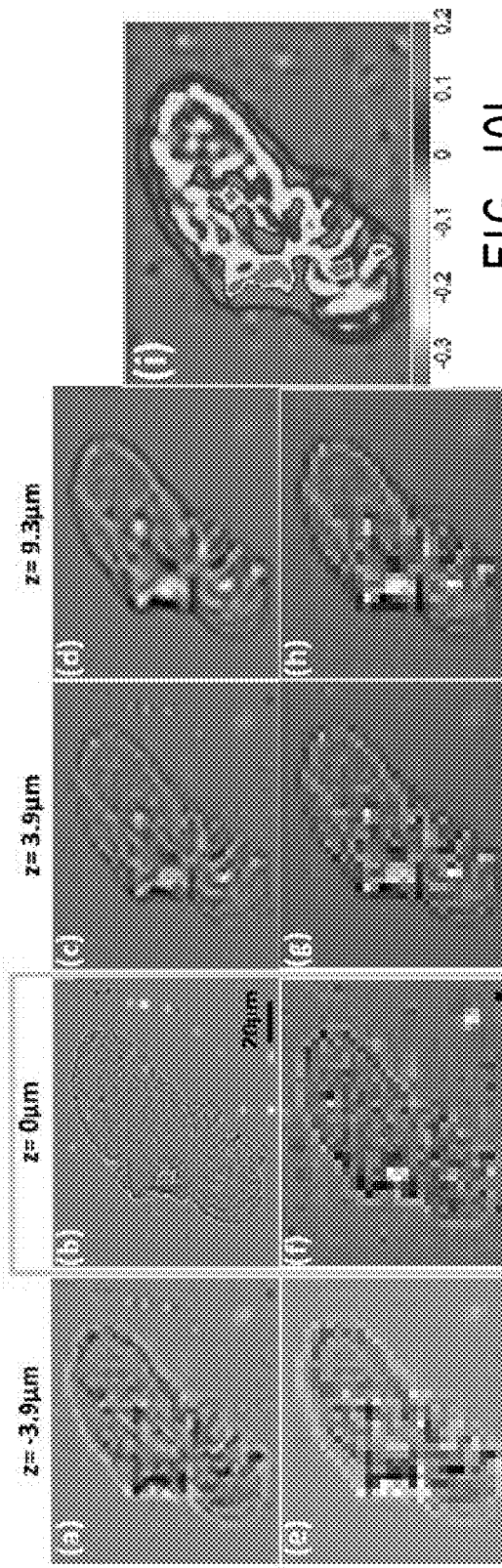

HIGH-RESOLUTION LIGHT-FIELD IMAGING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. Namely, this application claims priority to U.S. Provisional Patent Application 61/822,026, filed May 10, 2013, and entitled "IMPROVED-RESOLUTION LIGHT-FIELD IMAGING," the entirety of which is incorporated herein by reference.

STATEMENT REGARDING FEDERALLY SPONSORED R&D

This invention was made with government support under Grant #FA9550-12-1-0054 and Grant #FA9550-10-1-0108 awarded by the Air Force Office of Sponsored Research. The government has certain rights in the invention.

BACKGROUND

Field

The following disclosure relates generally to light-field imaging and light-field image processing.

Description of the Related Art

The spatial world is three-dimensional, yet conventional photographs record only a two-dimensional image. Thus, conventional photographic cameras reduce the complex interplay of light and matter in the three-dimensional world to a flat, two-dimensional recording of light intensity, as detected from the object space within the field of view of the camera. This flattening effect is a result of imaging, in which light rays reflected and/or scattered at different points on an object within the field of view of the camera are focused by a lens to corresponding points on an image plane. Angular information is lost in this process; for example, the light intensity recorded at a given pixel in a conventional image does not indicate the respective intensity contributions of light rays that originate from the corresponding point in the field of view with different angular orientations. Instead, the intensity measured at each point in the image plane is indicative of the combined intensity of the various light rays that enter the camera with different angular orientations from the corresponding point in the field of view. Thus, various properties like depth and certain light statistics cannot be determined quantitatively from a conventional image.

The flattening from three dimensions to two dimensions in a conventional camera significantly limits the information content of the image. Perhaps the simplest consequence of this flattening is ambiguity in depth, with objects behind and in front of the focal plane blurred (out of focus) in ways that can be difficult to describe quantitatively. There have been several methods developed to acquire depth information, which typically supplement a single two-dimensional image with at least one other measurement that can map to the third dimension. These include time gating (radar), interference of multiple beams (holography), axial displacement (focal stacks, phase retrieval), and transverse displacement (stereoscopic vision, lenslet arrays). Each method has its associated costs, usually in both physical and computational complexity. Typically, there are trade-offs in the final image quality as well. In fields that require accurate measurements, such as scientific, medical, and military imaging, the loss of three-dimensional data of the object space is disadvantageous. In such fields, and many others, the ability to record both spatial and angular information with high resolution would be advantageous.

One method of obtaining information regarding the respective intensities of light rays with different angular orientations from within the field of view is to provide a wavefront sensor, such as a Shack-Hartman array of lenslets in proximity to a sensor (e.g., a CCD or CMOS sensor). Each lenslet samples a spatially localized region of the wavefronts of light that enter the instrument from the field of view, and allows local angular information to be recorded on the sensor. In this way, the sensor can detect the respective intensity of light rays that arrive at each lenslet from different angular directions. This four-dimensional information of light intensity at each position (x, y) for each angle $(\theta_x, \theta_y)$ quantifies the light field within the instrument's field of view.

The price paid to acquire angular information using such lenslets is a reduction in resolution: spatial sampling is determined by the size of the lenslets rather than the size of the pixels in the camera sensor. Several pixels in the camera sensor correspond to each lenslet and now record the light intensity for different ray angles, so the information is distributed in phase space. This fundamental trade-off in spatial vs. angular resolution has plagued lenslet imaging since Lippman introduced lenslet imaging in 1908.

SUMMARY

Various devices, systems, and methods for enhancing the resolution of light-field images are disclose. In some embodiments, a camera system comprises: an image sensor configured to spatially sample light from an object space to obtain a first intensity reference image; a wavefront sensor configured to spatially sample wavefronts of light from at least a portion of the object space to obtain the intensity of the wavefronts and associated angular propagation directions of the wavefronts in order to obtain a first light-field image; and a processor configured to compute a second light-field image using information from the first intensity reference image, the second light-field image having an enhanced resolution that is greater than that of the first light-field image.

In some embodiments, a method, or a non-transitory computer-readable medium that causes a computer to perform the method, comprises: receiving a first intensity reference image of an object space captured by an image sensor; receiving a first light-field image captured by a wavefront sensor, the first light-field image comprising spatial samples of wavefronts of light from at least a portion of the object space that specify the intensity of the wavefronts and associated angular propagation directions of the wavefronts; and computing, using a processor, a second light-field image using information from the first intensity reference image, the second light-field image having an enhanced resolution that is greater than that of the first light-field image.

BRIEF DESCRIPTION OF THE DRAWINGS

Certain embodiments are illustrated in the accompanying drawings, which are for illustrative purposes only.

FIG. 1 is a schematic representation of an embodiment of a light-field camera.

FIGS. 9A-9C do not embody the resolution enhancement techniques described herein, while FIGS. 9D-9F do embody such resolution enhancement techniques.

FIGS. 10A-10T are a set of images that compare sample two-dimensional images of a cheek cell that were calculated from a four-dimensional light-field image at various different focal planes. FIGS. 10A-10D embody the resolution enhancement techniques described herein, while FIGS. 10E-10H do not embody such resolution enhancement techniques. FIG. 10I is a quantitative phase image obtained from FIGS. 10A-10C using the Transport of Intensity Equation.

DETAILED DESCRIPTION

Figure 2:
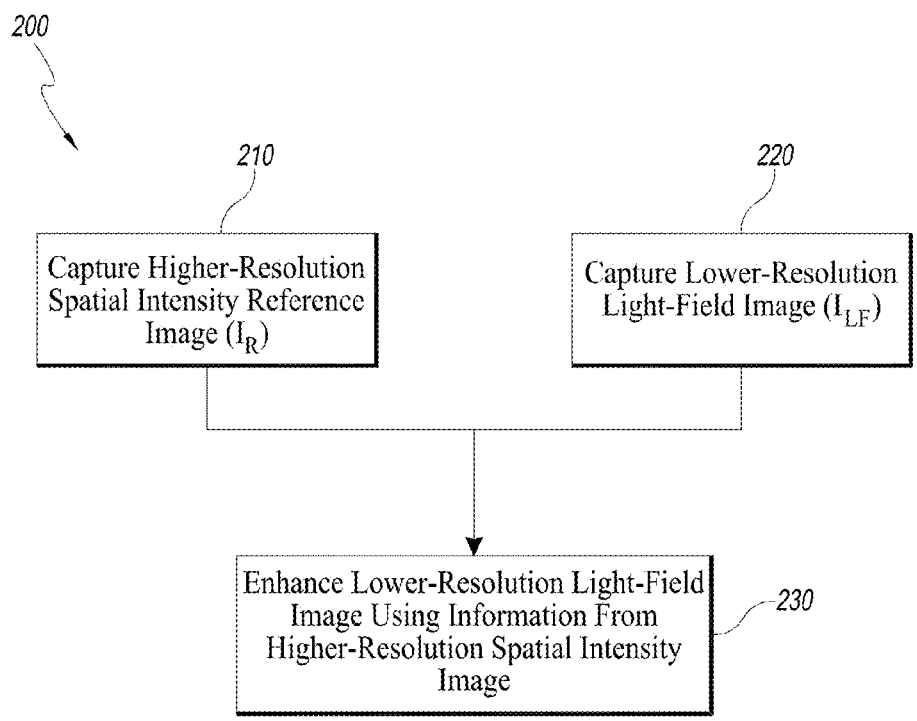
FIG. 2 is a flowchart of an embodiment of a method for enhancing the resolution of a four-dimensional light-field image.

The following disclosure includes various embodiments of devices and methods for enhancing the resolution of light-field images. A light-field image can be obtained using a wavefront sensor (e.g., a Shack-Hartmann array of lenslets) and generally includes a set of information that identifies the intensity of each of multiple light rays that are incident upon a particular location in an image plane at different angles. A light-field image may be four-dimensional in that it typically contains information about four different variables: x and y, which identify a particular spatial location in a two-dimensional image plane; and, $k_x$ and $k_y$ (or $\theta_x$ and $\theta_y$), which identify the intensity of light arriving at the corresponding (x, y) location from different directions. In a light-field image, pixels are devoted to recording information distributed over space and the angles of propagation of the light. A light-field image can be contrasted with a conventional spatial intensity image (generally referred to herein as a two-dimensional image, intensity image, or simply image) in that the former includes angular information about the intensity of light rays from different directions, while the latter does not include such directional information. In addition, a light-field image may be more than four-dimensional. For example, a light-field image may contain light wavelength and polarization variables. Light-field imaging is also known as plenoptic imaging and integral imaging.

According to some embodiments discussed herein, two or more pictures of a field of view are obtained: one or more conventional two-dimensional spatial intensity images (such as one that can be obtained using a conventional camera), and a four-dimensional light-field image taken with, for example, a wavefront sensor, such as a Shack-Hartmann lenslet array. The intensity image can typically have a higher spatial resolution than the light-field image because the spatial resolution of the intensity image can be defined by the size of the pixels in the camera sensor (assuming that such resolution is not otherwise limited by the optics of the camera), while the spatial resolution of the light-field image is typically defined by the larger lenslets. The two-dimensional spatial intensity image can be used as a reference image for enhancing the resolution of the light-field image. These two images can be combined so as to result in a composite light-field image with higher resolution that the original light-field image. Numerical algorithms can use the spatial intensity image as a constraint to improve the resolution of the lower-resolution light-field image. In some, but not necessarily all, embodiments, the spatial resolution of the intensity image serves as an upper bound on the spatial resolution of the composite light-field image.

The basic imaging condition used by a camera to create a conventional two-dimensional spatial intensity image is well-known. For points in the object space to map (focus) to points on an image, there is a fixed relationship between the object-to-lens distance and the image-to-lens distance. Technically, there is only one image-to-lens distance along the optical axis that is in focus for a given object-to-lens distance. In practice, the finite size of the pixels and/or the resolving ability of the eye mean that there are thin regions on either side of these planes that can be considered in focus (i.e., a small blurred dot can be treated as a point). At the imaging plane, all of the rays from a point on the object plane converge at a point on the detector (e.g. a CCD or CMOS sensor) and only the total intensity of all the rays combined is measured. There is no way to determine how much intensity each ray carried or the contribution from each direction of incoming light. Without knowledge of where the light is coming from or going to, there is no depth information in the image; three-dimensional information about the object space can only be determined if both the position and momentum/direction of the light rays are known.

One method of obtaining the directional information is to move the sensor away from the imaging condition and obtain an additional image (or images). For example, the sensor can be moved to record images at different planes (on either side of the plane that corresponds to the imaging condition), thus providing some depth information. Using this technique, angular contributions are detected separately, allowing numerical reconstruction of the depth if the displacement distance is known. However, retrieving the directional information in this manner is known to present certain difficulties, including relatively poor angular resolution, convergence problems with the transport algorithms, and relatively high sensitivity to noise.

Alternatively, the single lens of a camera can be replaced with many lenses in order to allow ray angles to be recorded, thus giving different angular views of the object. An array of small lenslets can be provided in, for example, the imaging plane; each lenslet can sample a localized portion of an incoming wavefront of light and image its angular spread onto the sensor. These rays can then be reassembled numerically to create a two-dimensional spatial intensity image. Further, since the ray directions are known, a computer can be used again to digitally re-focus the image at another focal plane. Such a device is illustrated in FIG. 1.

FIG. 1 is a schematic representation of an embodiment of a light-field camera 100, or plenoptic camera. The camera 100 includes an array 110 of lenslets 112 located in front of a camera sensor 120, such as a CCD sensor. The sensor 120 includes a number of pixels 122 arranged in columns and rows behind the lenslet array 110. The lenslets 112 spatially sample the wavefronts 104 of light that enter the camera from its field of view. Each wavefront 104 can be approximated by light rays 105, which are normal to the local slope of the wavefront 104. The lenslets 112 refract the light rays 105 and direct them to particular sensor pixels 122 which are dependent upon the respective angle at which each light ray is incident upon a given lenslet 112. Thus, each pixel 122 that corresponds to a particular lenslet 112 also corresponds to light that is incident upon that lenslet 112 from a particular direction. The distance $\Delta x$ from the axis 114 of the lenslet 112 to the location where the local wavefront is focused on the camera sensor 120 is related to the particular angle of incidence of the light. Each of the pixels 122 in the grouping corresponding to a particular lenslet 112 has a ($k_x$, ky) coordinate. By reading out the light intensity recorded by each of these pixels 122, it is possible to determine how much light was incident upon the corresponding lenslet 112 from each resolved angular direction. Effectively, parallax information from the different spatial locations of the lenslets can be used to determine object depth information.

With reference to the information contained in a four-dimensional light-field image, the position of each lenslet can be defined by an (x, y) coordinate, and the angle of the incident light at each (x, y) coordinate can be defined by a ($k_x$, $k_y$) coordinate. The light-field image simultaneously stores spatial (x, y) and spatial frequency ($k_y$, $k_y$) information in a four-dimensional description. It treats light propagation in the full (x, y, $k_x$, $k_y$) phase space, enabling numerical image refocusing and accounting for such features as locally varying coherence. Once a four-dimensional light-field image is obtained, two-dimensional intensity images at different focal planes can be reconstructed numerically. Phase-space representations simultaneously store spatial and spatial frequency information in a manner analogous to the position-momentum representation in mechanics. The four-dimensional information (x, y, $k_x$, $k_y$) gives both the intensity and direction of a given wavefront. This information is important for a variety of reasons, including phase measurement, three-dimensional depth reconstruction of the object space, digital refocusing, and adaptive optics.

The price paid for the collection of directional information by a light-field camera is often a reduction in spatial resolution: spatial sampling is determined by the size of the lenslet (e.g., ~200 µm, though other sizes are possible), not the size of the pixels in the detector (e.g., ~2 µm, though other sizes are possible). Each pixel now records ray angle as well as point intensity, so the information is distributed in phase space. This fundamental trade-off in spatial vs. angular resolution has been problematic in lenslet imaging for more than one hundred years.

Although the light-field camera 100 in FIG. 1 is illustrated as having lenslets 112 (Shack-Hartmann device), these could be replaced by simple pinhole apertures (Hartmann device). Light-field measurements are commonly made using pinhole or lenslet arrays because of their ability to acquire the four-dimensional light field in a single exposure. Unfortunately, pinhole and the lenslet arrays may force a trade-off between spatial and angular sampling, resulting in relatively poor resolution and/or reduced dynamic range in either or both domains. More specifically, a large lens is generally needed to capture a wide angular spread, but the diameter of the lens (rather than the pixel size on the sensor) sets the spatial resolution.

In some embodiments, this trade-off between spatial and angular sampling in a Shack-Hartmann or Hartmann device can be at least partially overcome by using a scanning pinhole or lenslet and a windowed Fourier transform. In this case, the size of the pinhole/lenslet sets the resolution and a large range of angles can be detected via a local Fourier transform. Relatively high resolution is possible, particularly if the pinhole/lenslet is scanned in small increments, although such point-by-point scanning decreases the acquisition speed and increases the complexity of the system. Such scanning devices may still benefit, however, from the resolution enhancement techniques disclosed herein. The devices and methods disclosed herein are compatible with any type of light-field camera, not solely Shack-Hartmann or Hartmann devices, or scanning aperture/lenslet devices. One possible advantage of using the techniques described herein with wavefront sensors, such as Shack-Hartmann or Hartmann devices, however, is the possibility for both high-speed and high-resolution light-field imaging.

As discussed herein, in light-field imaging, a lenslet array (or other light-field camera) is used to measure both the position intensity and angular spread of incoming light. However, such light-field images may have relatively low resolution. According to the techniques described herein for improved light-field imaging, in some embodiments, one or more additional two-dimensional, high-resolution spatial intensity images (e.g., from a conventional photographic camera) can be combined with the original coarse-grained light-field image. For example, a high-resolution spatial intensity image can record the intensity at positions (x, y) and can then be used to numerically reconstruct high resolution in angular spread ($k_x$, $k_y$).

FIG. 2 is a flowchart of an embodiment of a method 200 for enhancing the resolution of a four-dimensional light-field image. The method begins at steps 210 and 220 by capturing a relatively higher-resolution two-dimensional spatial intensity image, $I_R$(x, y), and a relatively lower-resolution (course-grained) four-dimensional light-field image, $I_{LF}$(x, y, $k_x$, $k_y$). The two-dimensional spatial intensity image $I_R$ can be used as a reference image for enhancing the resolution of the four-dimensional light-field image $I_{LF}$. In some embodiments, $I_R$ and $I_{LF}$ can share a common focal plane, though this is not required. In addition, in some embodiments, $I_R$ can be substantially in focus, though again this is not required. However, possible advantages of having $I_R$ in focus can include the following: removing ambiguity from the computed high-resolution light-field image; having a baseline of diffraction-limited imaging (and beyond with super-resolution techniques), which can be particularly important for microscopy, etc.; and providing for compatibility with existing imaging systems and algorithms that rely on this plane, such as autofocus, face recognition, etc.

As discussed further herein, the two images referred to in steps 210 and 220 can be captured simultaneously by a single camera device or by separate camera devices. Such embodiments of simultaneous capture could be useful for taking pictures of fast-moving objects and the ability to produce high-resolution light-field videos. Alternatively, the two images can be captured at different times by a single device or by separate devices. If the two-dimensional spatial intensity image, $I_R(x, y)$, and the four-dimensional light-field image, $I_{LF}(x, y, k_x, k_y)$, are captured at different times, or by different devices, it may be advantageous to perform additional processing in order to align or register the two images to a common frame of reference before continuing the method.

Next, at step 230, a computer or other processor is used to enhance the lower resolution light-field image, $I_{LF}(x, y, k_x, k_y)$, using information from the higher-resolution spatial intensity image(s), $I_R(x, y)$. As discussed herein, this can be done by using the higher-resolution spatial intensity image, $I_R(x, y)$, to provide one or more constraints that are used to adjust the values of an up-sampled, interpolated version of the lower-resolution light-field image, $I_{LF}(x, y, k_x, k_y)$. In some embodiments, the reference image, $I_R(x, y)$, is used as a known position-space prior to interpolate values in momentum-space. In some embodiments, the high-resolution reference image, $I_R(x, y)$, is used to numerically extrapolate resolution in the light-field image $I_{LF}(x, y, k_x, k_y)$. The computation of the high-resolution light-field image can be linear or non-linear. Reconstruction of an image from pure light-field data can be ambiguous (ill-posed), particularly if the object has large areas of constant intensity, whereas embodiments of the techniques described herein are capable of guaranteeing a unique solution. In some embodiments, bandwidth extrapolation techniques can be used to further enhance the resolution of the computed light-field image and/or extend the angular information.

The result is a composite four-dimensional light-field image with enhanced resolution in both space and angle. For example, spatial resolution of the light-field image can be enhanced in the original focal plane of the light-field image and/or in the focal plane of the reference image. This, in turn, also increases angular resolution in other focal planes because re-focusing a light-field image to different focal planes involves a shearing operation which combines spatial and angular coordinates. Angular resolution in the light-field image can also be improved by using intensity reference images from different angular points of view in the algorithms discussed herein. The algorithms discussed herein can involve relatively little physical or computational overhead, as only a single extra picture need be taken (though more than one additional picture can also be used, as discussed herein) and the signal processing computational tax is not heavy.

Figure 3:
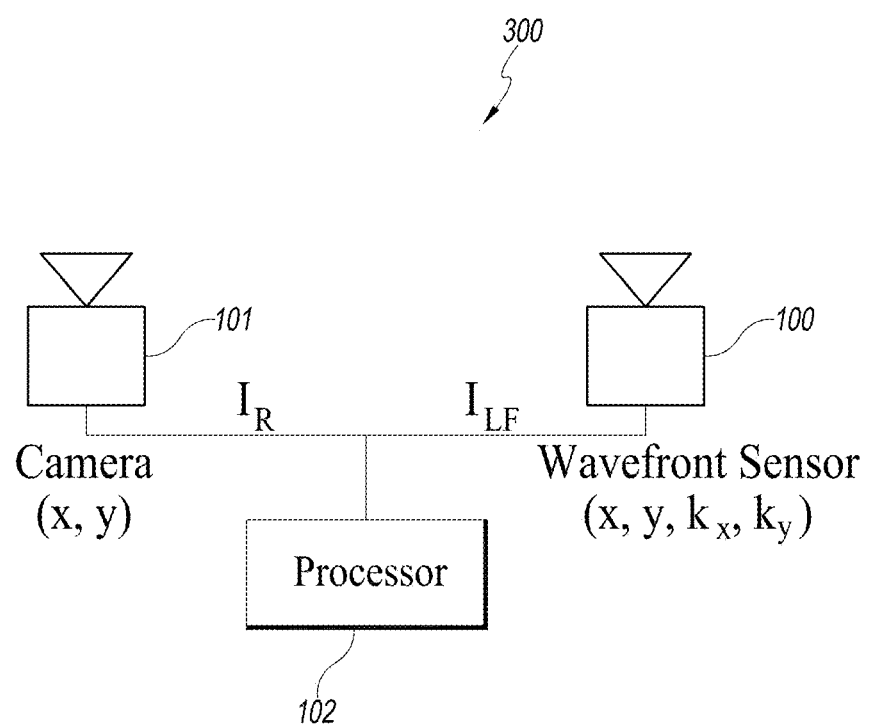
FIG. 3 is a schematic representation of an embodiment of a camera system capable of providing four-dimensional light-field images with enhanced resolution.

FIG. 3 is a schematic representation of an embodiment of a camera system 300 capable of providing four-dimensional light-field images with enhanced resolution. The camera system 300 includes a light-field camera 100 having a wavefront sensor for obtaining a light-field image, $I_{LF}(x, y, k_x, k_y)$. As discussed herein, the light-field camera 100 can be a Shack-Hartmann device, a Hartmann device, or any other type of camera capable of obtaining a four-dimensional light-field image. The camera system 300 also includes a conventional camera 101 having an image sensor for obtaining a relatively high-resolution spatial intensity image, $I_R(x, y)$. The camera 101 can be any type of camera capable of obtaining a spatial intensity image, including a digital single lens reflex (DSLR) camera, a compact (e.g., point-and-shoot) camera, machine vision camera, a microscope camera, a coincidence rangefinder, etc. In some embodiments, the light-field camera 100 and the camera 101 are both standalone devices. In other embodiments, the light-field camera 100 can be designed as an add-on to be integrated with an existing camera 101 or vice versa. For example, the light-field camera 100 can be designed as a hot shoe, viewfinder, or lens filter attachment for an existing camera. The light-field camera 100 and the camera 101 can be communicatively coupled to a processor 102 (e.g., via a wired or wireless communication link, removable storage media, etc.). The processor 102 can be programmed to carry out the computational methods described herein in order to obtain a composite light-field image with enhanced resolution.

In some embodiments, the light-field camera 100 and the camera 101 are physically arranged such that their fields of view are identical, such that they substantially overlap, or such that they at least partially overlap. In some embodiments, the light-field camera 100 and the camera 101 can be focused at a common plane, though this is not necessarily required.

In some embodiments, the light detected by the light-field camera 100 and the camera 101 is incoherent light. In some embodiments, the wavefronts sampled by the light-field camera 100 and the camera 101 are coherent waveforms. In some embodiments, the light detected by the light-field camera 100 and the camera 101 is an evanescent field. In some embodiments, the imaging condition is satisfied by the light-field camera 100 and/or the camera 101 for a given object in the object space. In some embodiments, the intensity measurement captured by the camera 101 is a Fourier transform (e.g., this can occur when both the object and the image sensor are located substantially one focal length away from the lens).

The light-field image $I_{LF}(x, y, k_x, k_y)$ and the intensity reference image $I_R(x, y)$ can be captured simultaneously or at different instances in time. The light-field camera 100 and the camera 101 can be configured such that the images $I_{LF}(x, y, k_x, k_y)$ and $I_R(x, y)$ are registered as captured. Alternatively, post-capture image processing can be performed on the images $I_{LF}(x, y, k_x, k_y)$ and $I_R(x, y)$ in order to reduce or eliminate differences in their respective frames of reference. For example, such image processing operations may include translation, rotation, scaling, shearing, or any of a variety of other registration transforms. In addition, the registration operations described herein can also include operations to reduce or eliminate differences in the focal planes of an intensity reference image and a light-field image. Such focal plane corrections can include the usage of a propagation operator, which can be a linear transfer function such as a diffraction operator.

In some embodiments, the camera sensor 101 and the wavefront sensor 100 can collectively act as a coincident rangefinder. For example, the wavefront sensor 100 and the camera sensor 101 can be located at triangulation points of the rangefinder and can be used to determine depth information by parallax.

Figure 4:
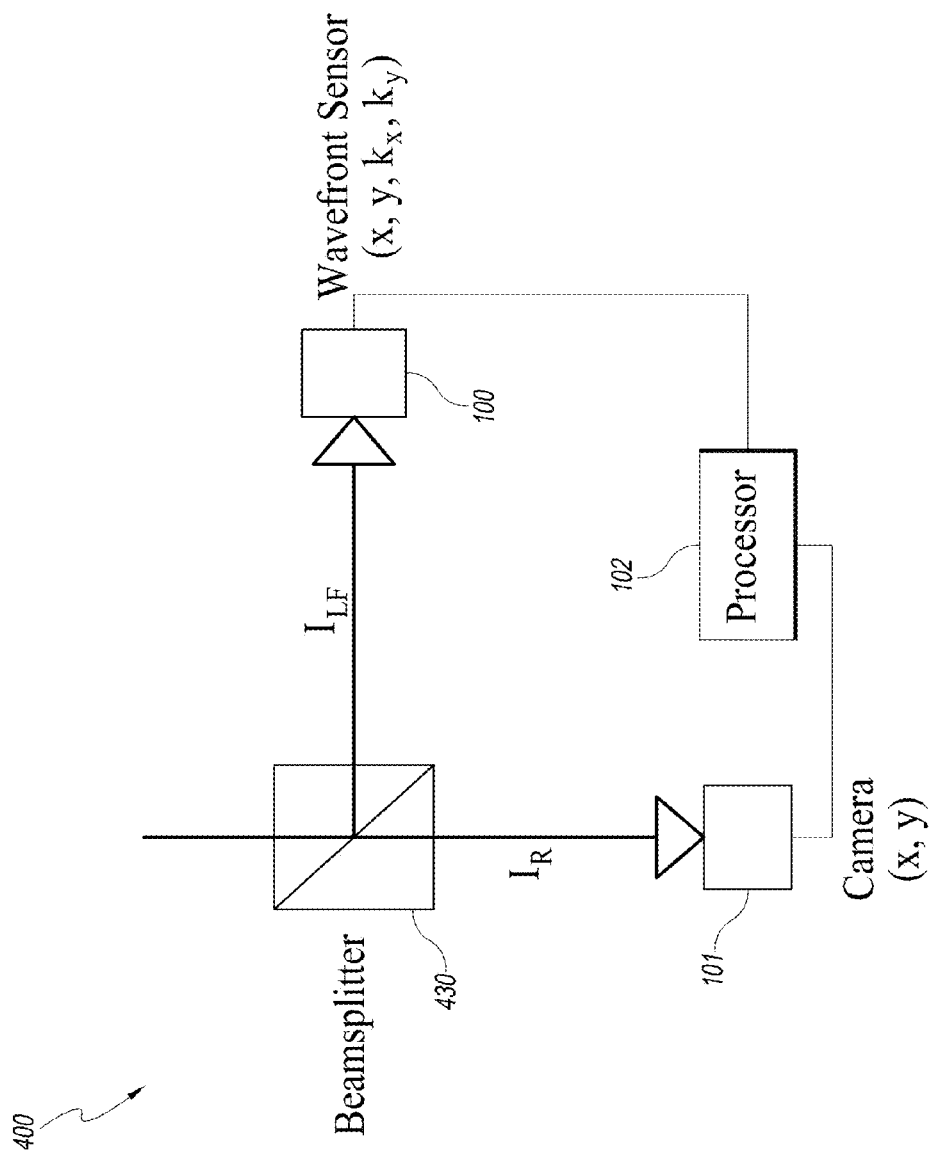
FIG. 4 is a schematic representation of an embodiment of a camera capable of providing four-dimensional light-field images with enhanced resolution.

FIG. 4 is a schematic representation of an embodiment of a camera 400 capable of providing four-dimensional light-field images with enhanced resolution. The camera 400 can be an integrated unit that includes a wavefront sensor 100 for capturing light-field images, $I_{LF}(x, y, k_x, k_y)$. The camera 400 can also include a conventional camera sensor 101 for obtaining spatial intensity images, $I_R(x, y)$.

As opposed to the camera system 300 illustrated in FIG. 3, the camera 400 includes a beam splitter 430 or other aperture-sharing element (e.g., a mirror or prism) to combine the optical paths of the wavefront sensor 100 and the conventional camera sensor 101. In particular, the beam splitter 430 can combine the respective optical axes of the wavefront sensor 100 and the conventional camera sensor 101. The shared optical axis and aperture can facilitate simultaneous and/or registered capture of the images $I_{LF}$(x, y, $k_x$, $k_y$) and $I_R$(x, y). Once these images have been captured, they can be processed by, for example, a processor 102 (which may be built into the device or standalone) according to the algorithms disclosed herein in order to obtain a composite light-field image having enhanced resolution.

Figure 5:
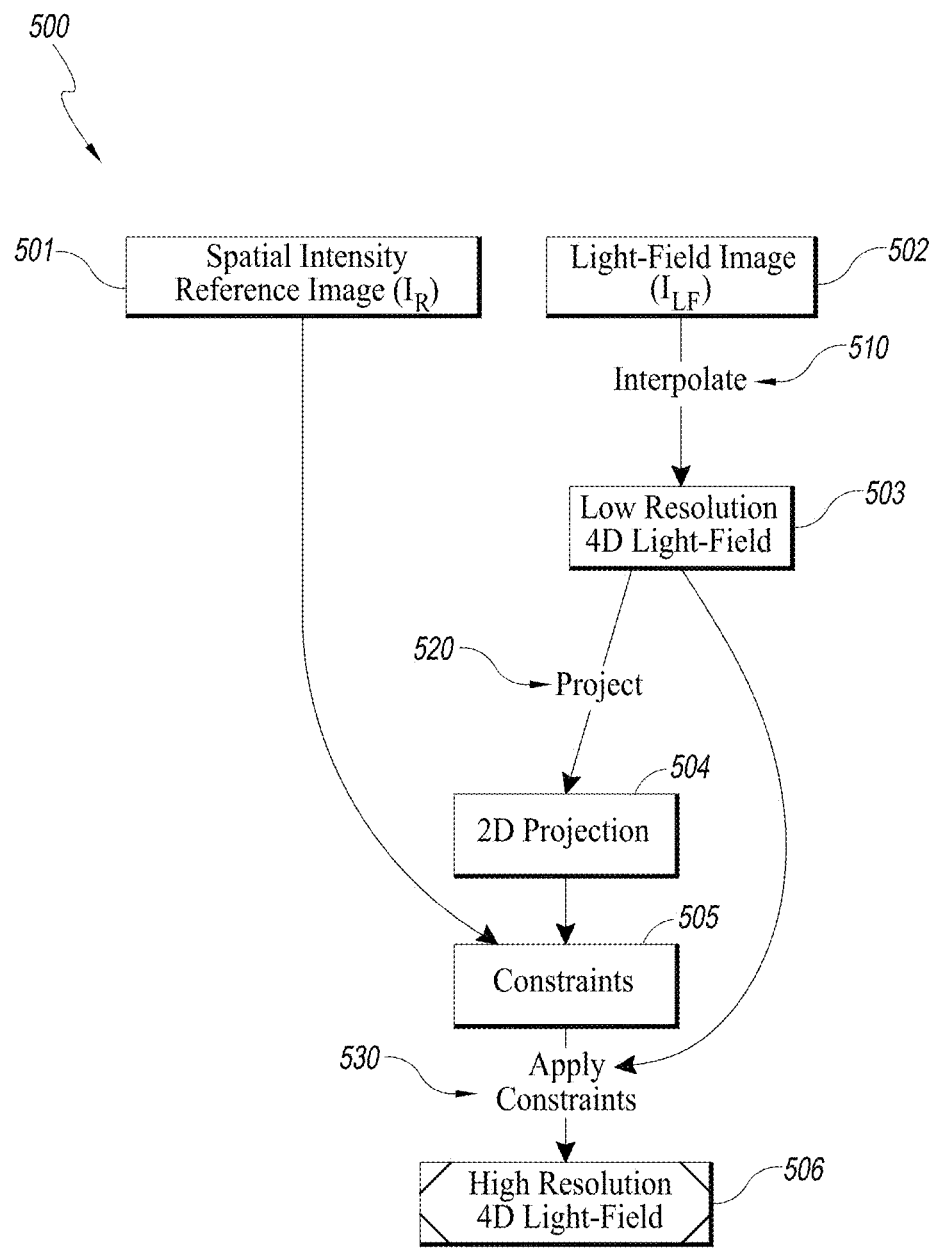
FIG. 5 is a schematic representation of an embodiment of a method for enhancing the resolution of a four-dimensional light-field image using a higher resolution two-dimensional reference image.

FIG. 5 is a schematic representation of an embodiment of a method 500 for enhancing the resolution of a four-dimensional light-field image using a higher resolution two-dimensional reference image. The method 500 begins with a spatial intensity reference image 501, $I_R$(x, y), and a light-field image 502, $I_{LF}$(x, y, $k_x$, $k_y$). The spatial intensity reference image 501 has a higher spatial resolution than the light-field image 502 such that it includes some multiple of (x, y) data points more than the number of (x, y) data points in the light-field image 502. These images can be captured, for example, by one of the devices illustrated in FIGS. 3 and 4. In some embodiments, the reference image $I_R$ and the light-field image $I_{LF}$ are both focused at a common plane, though this is not necessarily required. In addition, the method illustrated in FIG. 5, as well as the other methods disclosed herein, can involve the use of multiple reference images $I_R$ in order to enhance the resolution of $I_{LF}$.

The method 500 continues with an interpolation operation 510. The interpolation operation 510 can include an up-sampling operation of the light-field image 502, for example, to match the number of (x, y) data points in $I_{LF}$ to the number of (x, y) data points in $I_R$. Linear interpolation (or any other type of interpolation) can then be applied to the up-sampled light-field image 502. The result of the interpolation operation 510 can be a low-resolution four-dimensional light-field image 503 having the same number of (x, y) data points as the reference image $I_R$.

The method 500 continues with a projection operation 520. The projection operation 520 is used to transform the four-dimensional light-field image 503 into a two-dimensional image. This can be done, for example, by integrating the directional data points ($k_x$, $k_y$) for each (x, y) data point, or by otherwise mathematically combining the directional information for a given location in the image plane. The result is a two-dimensional projection 504 of the four-dimensional low-resolution light-field image 503. Once the two-dimensional projection 504 of the light-field image 503 has been obtained, it can be used, along with the spatial intensity reference image 501, in order to calculate constraints 505.

In some embodiments, the constraints 505 are a set of factors that map the two-dimensional projection 504 of the low-resolution light-field image 503 to the intensity reference image 501. For example, the constraints 505 can include a coefficient for each (x, y) data point. The coefficient for each data point can be a value that, when multiplied times an (x, y) data point in the two-dimensional projection 504 of the low-resolution light-field image 503, converts it to the corresponding (x, y) data point in the spatial intensity image 501. Other constraints can include realness, analyticity, and non-negativity of the intensity values, as discussed herein. In addition, constraints can be derived from knowledge of the object space, such as sparseness or image statistics.

Once the constraints 505 have been determined, they can be applied at step 530 of the method 500. In some embodiments, application of the constraints may involve point-by-point multiplication of the constraints 505 by the low-resolution light-field image 503. For example, a scaling coefficient corresponding to each (x, y) point in the two-dimensional projection 504 can be multiplied times each ($k_x$, $k_y$) value corresponding to that (x, y) point in the low-resolution four-dimensional light-field image 503. In this way, the ($k_x$, $k_y$) values are scaled in proportions that are based on spatial information from the intensity reference image 501. The result of the method 500 is a composite four-dimensional light-field image 506 having enhanced resolution. If desired, the method 500 can be repeated using a second intensity reference image, such as one that is focused at a different plane than the first intensity reference image or taken from a different point of view.

Figure 6:
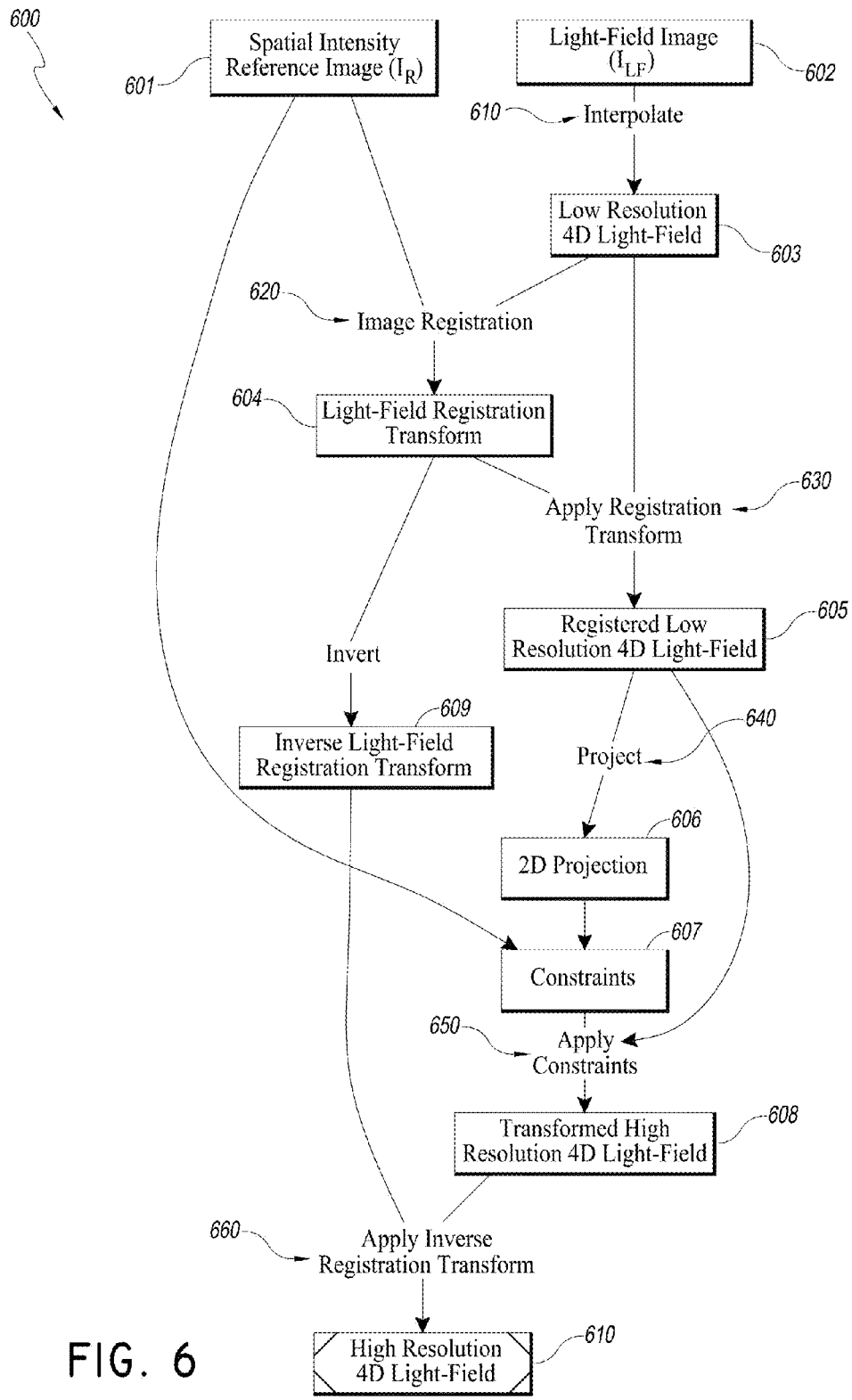
FIG. 6 is a schematic representation of another embodiment of a method for enhancing the resolution of a four-dimensional light-field image using a higher resolution two-dimensional reference image.

FIG. 6 is a schematic representation of another embodiment of a method 600 for enhancing the resolution of a four-dimensional light-field image using a higher resolution two-dimensional reference image. Similar to the method 500 illustrated in FIG. 5, the method 600 begins with a spatial intensity reference image 601, $I_R$(x, y), and a light-field image 602, $I_{LF}$(x, y, $k_x$, $k_y$). The spatial intensity reference image 601 has a higher spatial resolution than the light-field image 602 such that it includes some multiple of (x, y) data points more than the number of (x, y) data points in the light-field image 602. Again, similar to the method 500 illustrated in FIG. 5, the method 600 continues with an interpolation operation 610. The interpolation operation 610 can include an up-sampling operation of the light-field image 602, for example, to match the number of (x, y) data points in $I_{LF}$ to the number of (x, y) data points in the reference image $I_R$. Linear interpolation (or any other type of interpolation) can then be applied to the up-sampled light-field image 602, resulting in a low-resolution four-dimensional light-field image 603 having the same number of (x, y) data points as the reference image $I_R$. In some embodiments, the reference image $I_R$ and the light-field image $I_{LF}$ are both focused at a common plane, though this is not necessarily required. In addition, the method illustrated in FIG. 6, as well as the other methods disclosed herein, can involve the use of multiple reference images $I_R$ in order to enhance the resolution of $I_{IF}$.

The method 600 is similar to the method 500 illustrated in FIG. 5, except that it can include various image registration operations to align the reference image 601 and the light-field image 602. Such image registration operations can be advantageous where, for example, the spatial intensity reference image 601, $I_R$(x, y), and the light-field image 602, $I_{LF}$(x, y, $k_x$, $k_y$), do not share a common frame of reference. Depending upon the method of image capture, the two images 601, 602 may have differences in scaling, rotation, perspective, parallax, etc. that can be reduced or eliminated using the image registration operations of the method 600. In general, the image registration operations in the method 600 of FIG. 6 are intended to reduce or eliminate differences between the respective frames of reference of the spatial intensity image 601, $I_R$(x, y), and the light-field image 602, $I_{LF}$(x, y, $k_x$, $k_y$) prior to subsequent processing.

At step 620, one or more image registration operations are performed. These operations receive the spatial intensity image 601 and the low-resolution four-dimensional light-field image 603 as inputs. The result of step 620 is a light-field registration transform 604. The light-field registration transform 604 can be, for example, a matrix that, when multiplied times the low-resolution four-dimensional light-field image 603, substantially (or at least partially) aligns or registers the light-field image 603 to the intensity image 601. In some embodiments, the light-field registration transform 604 can perform operations such as, rotation, scaling, translation, shearing, perspective correction, feature identification, feature matching, feature mapping, correlation between the reference image and the light-field image, and/or combinations of the same and the like. At step 630, the registration transform 604 is applied to the low-resolution four-dimensional light-field image 603. The result is a registered low-resolution four-dimensional light-field image 605.

Similar to the method 500 in FIG. 5, the method 600 continues with a projection operation 640. The projection operation 640 is used to transform the four-dimensional light-field image 603 into a two-dimensional image. This can be done by integrating the directional data points ($k_x$, $k_y$) for each (x, y) data point, or by otherwise mathematically combining the directional information for each point. The result is a two-dimensional projection 606 of the four-dimensional low-resolution light-field image 603. Once the two-dimensional projection 606 of the light-field image 603 has been obtained, it can be used, along with the spatial intensity reference image 601, in order to calculate constraints 607.

Once again, in some embodiments, the constraints 607 are a set of factors that map the two-dimensional projection 606 of the registered low-resolution light-field image 605 to the intensity reference image 601. For example, the constraints 607 can include a coefficient for each (x, y) data point. The coefficient for each data point can be a value that, when multiplied times an (x, y) data point in the two-dimensional projection 606 of the registered low-resolution light-field image 605, converts it to the corresponding (x, y) data point in the spatial intensity reference image 601.

Once the constraints 607 have been determined, they can be applied at step 650 of the method 600. In some embodiments, application of the constraints may involve point-by-point multiplication of the constraints 607 times the registered low-resolution light-field image 605. For example, a scaling coefficient corresponding to each (x, y) point in the two-dimensional projection 606 can be multiplied times each ($k_x$, $k_y$) value corresponding to that (x, y) point in the registered low-resolution four-dimensional light-field image 605. The result is a composite four-dimensional light-field image 608 having enhanced resolution.

Optionally, the method 600 can continue by converting the high-resolution four-dimensional light-field image 608 back into its original frame of reference. This can be done by inverting the previously-applied registration transform 604. For example, the method 600 can include an operation 670 to invert the light-field registration transform 604. The result of this operation 670 is an inverse light-field registration transform 609. At step 660, this inverse registration transform 609 can be applied to the high-resolution four-dimensional light-field image 608. The result is a high-resolution four-dimensional light-field image 610 which has been substantially (or at least partially) converted back to its original frame of reference. If desired, the method 600 can be repeated using a second intensity reference image, such as one that is focused at a different plane than the first intensity reference image or taken from a different point of view.

Figure 7:
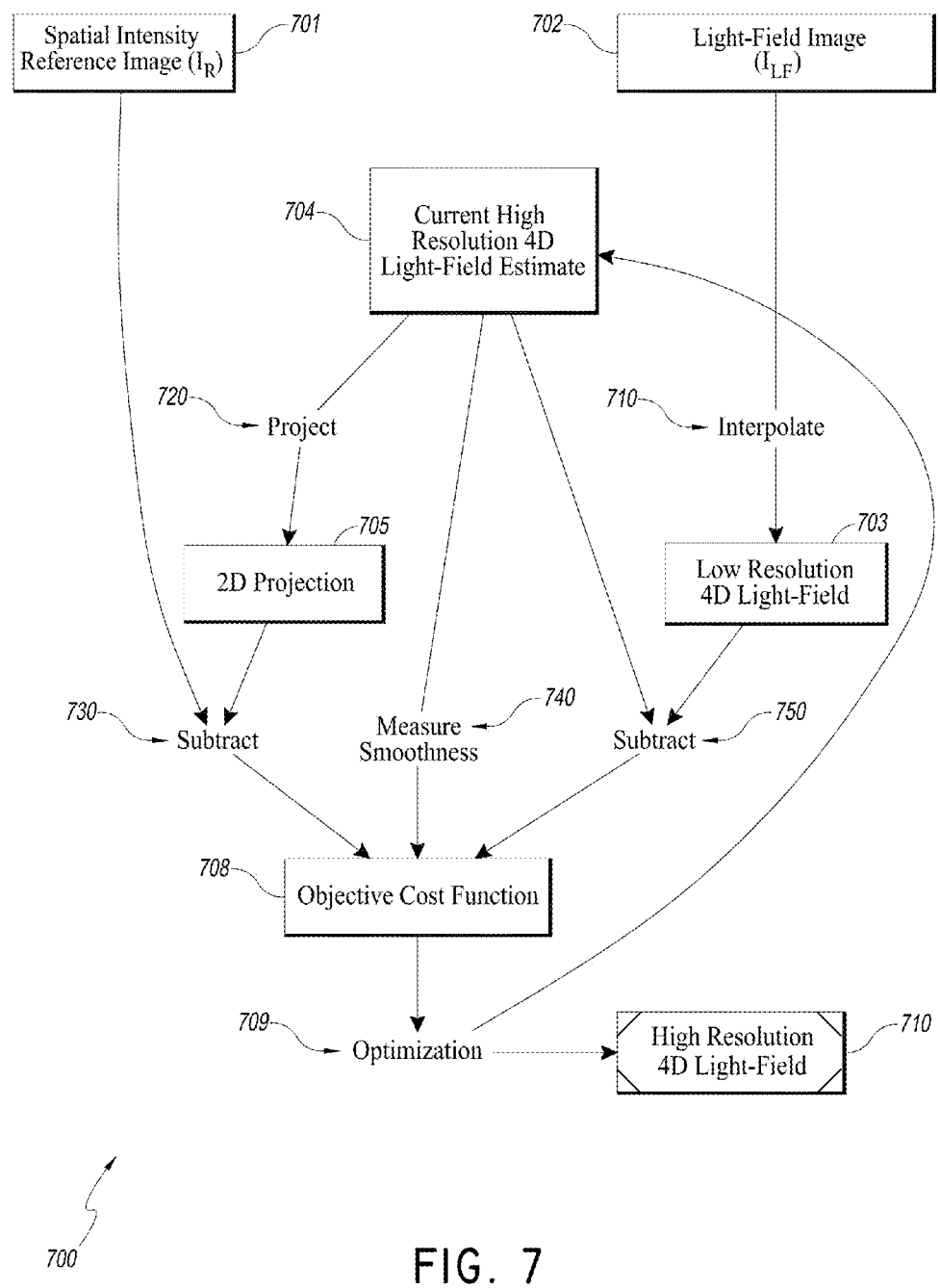
FIG. 7 is a schematic representation of another embodiment of a method for enhancing the resolution of a four-dimensional light-field image using a higher resolution two-dimensional reference image.

FIG. 7 is a schematic representation of another embodiment of a method 700 for enhancing the resolution of a four-dimensional light-field image using a higher resolution two-dimensional reference image. The method 700 is an iterative method that involves optimization of an objective cost function. The objective cost function may be a sum (weighted or otherwise), or some other aggregate (e.g., Boolean combination, fuzzy logic combination, etc.), of a plurality of image characteristics. Each of such image characteristics may be quantified by a function. Examples of image characteristics which may be quantified for inclusion in the objective cost function include the following: differences between a captured lower-resolution light-field image and an estimate of the same light-field image with enhanced resolution (e.g., step 750); differences between one or more higher-resolution spatial intensity reference images and a two-dimensional projection of the estimated light-field image with enhanced resolution (e.g., step 730); and the smoothness of the estimated light-field image with enhanced resolution (e.g., step 740). Other characteristics could also be input into the objective cost function. For example, if one has information about the statistical distribution of light-field images (e.g., from previous measurements of light-field images, or from theoretical models), one can include a penalty for features that do not agree with the prior, which will make the resulting image more similar to the distribution of the already taken images.

The method 700 begins with one or more spatial intensity reference images 701, $I_R$(x, y), and a light-field image 702, $I_{LF}$(x, y, $k_x$, $k_y$). In embodiments, where multiple reference images 701 are used, they can each be focused at different planes or include other differences (e.g., angles of view) that expand the total amount of reference information. The spatial intensity reference image 701 has a higher spatial resolution than the light-field image 702 such that it includes some multiple of (x, y) data points more than the number of (x, y) data points in the light-field image 702. Similar to the methods illustrated in FIGS. 5 and 6, the method 700 continues with an interpolation operation 710. The interpolation operation 710 can include an up-sampling operation of the light-field image 702, for example, to match the number of (x, y) data points in $I_{LF}$ to the number of (x, y) data points in the reference image $I_R$. Linear interpolation (or any other type of interpolation) can then be applied to the up-sampled light-field image 702, resulting in a low-resolution four-dimensional light-field image 703 having the same number of (x, y) data points as the reference image $I_R$.

In the first iteration of the method 700, the low-resolution four-dimensional light-field image 703 can be used to populate the current estimate 704 of the high-resolution light field. In addition, during each iteration of the method 700, a projection operation 720 can be performed. The projection operation 720 is used to transform the current estimate 704 of the high-resolution four-dimensional light-field image into a two-dimensional image. This can be done by integrating the directional data points ($k_x$, $k_y$) for each (x, y) data point, or by otherwise mathematically combining the directional information for each point. The result is a two-dimensional projection 705 of the current estimate of the high-resolution four-dimensional light-field image 704. Once the two-dimensional projection 705 of the light-field image 704 has been obtained in each iteration, it can be used in one or more functions that quantify image characteristics for inclusion in the objective cost function that is to be optimized. In embodiments of the method 700 where multiple reference images 701 with different focal planes are used, the current estimate of the high-resolution four-dimensional light-field image 704 can be computationally re-focused to the focal plane corresponding to each reference image, and a two-dimensional projection 705 can be calculated to correspond to each reference image.

The method 700 then continues by quantifying the various image characteristics which are input into the objective cost function for optimization. One of the quantified image characteristics can include differences between the current estimate 704 of the high-resolution four-dimensional light-field image and the low-resolution four-dimensional light-field image 703. Such differences can be quantified, for example, by subtracting the low-resolution light-field image 703 from the current estimate 704 of the high-resolution light-field image, or vice versa, as illustrated at step 750. The difference values for each point can then be summed to obtain a total difference value. Other measures of the differences between the current high-resolution estimate 704 and the low-resolution light-field image 703 can also be used.

Another image characteristic which can be included in the objective cost function for optimization can include differences between the two-dimensional projection 705 of the current estimate 704 of the high-resolution four-dimensional light-field image and the high-resolution spatial intensity reference image 701. Such differences can be quantified, for example, by subtracting the spatial intensity image 701 from the two-dimensional projection 705 of the current estimate 704 of the high-resolution four-dimensional light-field image, or vice versa, as illustrated at step 730. The difference values for each point can then be summed to obtain a total difference value. Other measures of the differences between the two-dimensional projection 705 of the current estimate 704 of the high-resolution light-field image and the high-resolution spatial intensity reference image 701 can also be used. In embodiments where multiple reference images 701 are used, the objective cost function can include a difference term for each reference image.

Yet another image characteristic which can be included in the objective cost function that is to be optimized can include one or more measures of the smoothness of the current estimate 704 of the high-resolution four-dimensional light-field image. The smoothness of the current estimate of the light-field image can be quantified by calculating derivatives (first-order, second order, or higher-order) of the current estimate 704 of the high-resolution light-field image. The derivative values can then be summed to obtain a total smoothness value. Other measures of the smoothness of the current estimate of the high-resolution light-field image can also be used. In addition, another image characteristic that can be included in the cost function is a penalty on gradients so that the reconstructed image is not noisy or does not converge on something random.

The foregoing image characteristics which are quantified at steps 730, 740, and 750 can be input into the objective cost function 708. In some embodiments, the objective cost function 708 is a weighted sum of the foregoing quantified image characteristics. The particular weightings can be determined, for example, experimentally, theoretically, and/or by trial and error. The objective cost function can then be optimized, as illustrated at 709. Depending upon the particular embodiment of the objective cost function 708, the optimization procedure 709 can involve, for example, increasing or maximizing the objective cost function 708, or decreasing or minimizing the objective cost function 708. The optimization procedure 709 can be used to compute new values for the estimated high-resolution light-field image 704. In addition, the optimization procedure 709 can be constrained, if desired. For example, the optimization procedure 709 can be constrained to limit the updated values for the estimated high-resolution light-field image to be positive (since negative light intensity values are not physically possible). The optimization procedure can also be constrained based on the reality, analyticity, and consistency of the estimated high-resolution light-field image 704. In some embodiments, the optimization procedure is the limited memory Broyden-Fletcher-Goldfarb-Shanno algorithm (L-BFGS-B) with bound constraints, though many difference optimization procedures can be used.

The method 700 can be performed iteratively for a set number of cycles, a set period of time, or until the optimization procedure 709 converges to within a desired threshold. The output of the method 700 is a four-dimensional light-field image with enhanced resolution 710.

Although not specifically illustrated, the method 700 can also include image registration procedures, as discussed herein. Such image registration procedures can be used to reduce or eliminate differences between the frames of reference of the reference image(s) and the captured light-field image. In some embodiments, course-grained versions of the reference image(s) can be used to aid registration. In addition, as already discussed, the method 700 can also receive as inputs multiple different high-resolution spatial intensity reference images 701. For example high-resolution spatial intensity reference images 701 with different focal planes, perspectives, angles of view, etc. can be used in comparison to the estimated high-resolution light-field image 704 (or two-dimensional projections thereof at different focal planes) in order to calculate additional image characteristics which can be included in the objective cost function 708. Furthermore, the reference image(s) can be used in conjunction with more than one lower-resolution light-field image in order to compute a high-resolution light-field image (in any of the methods discussed herein).

Figure 8:
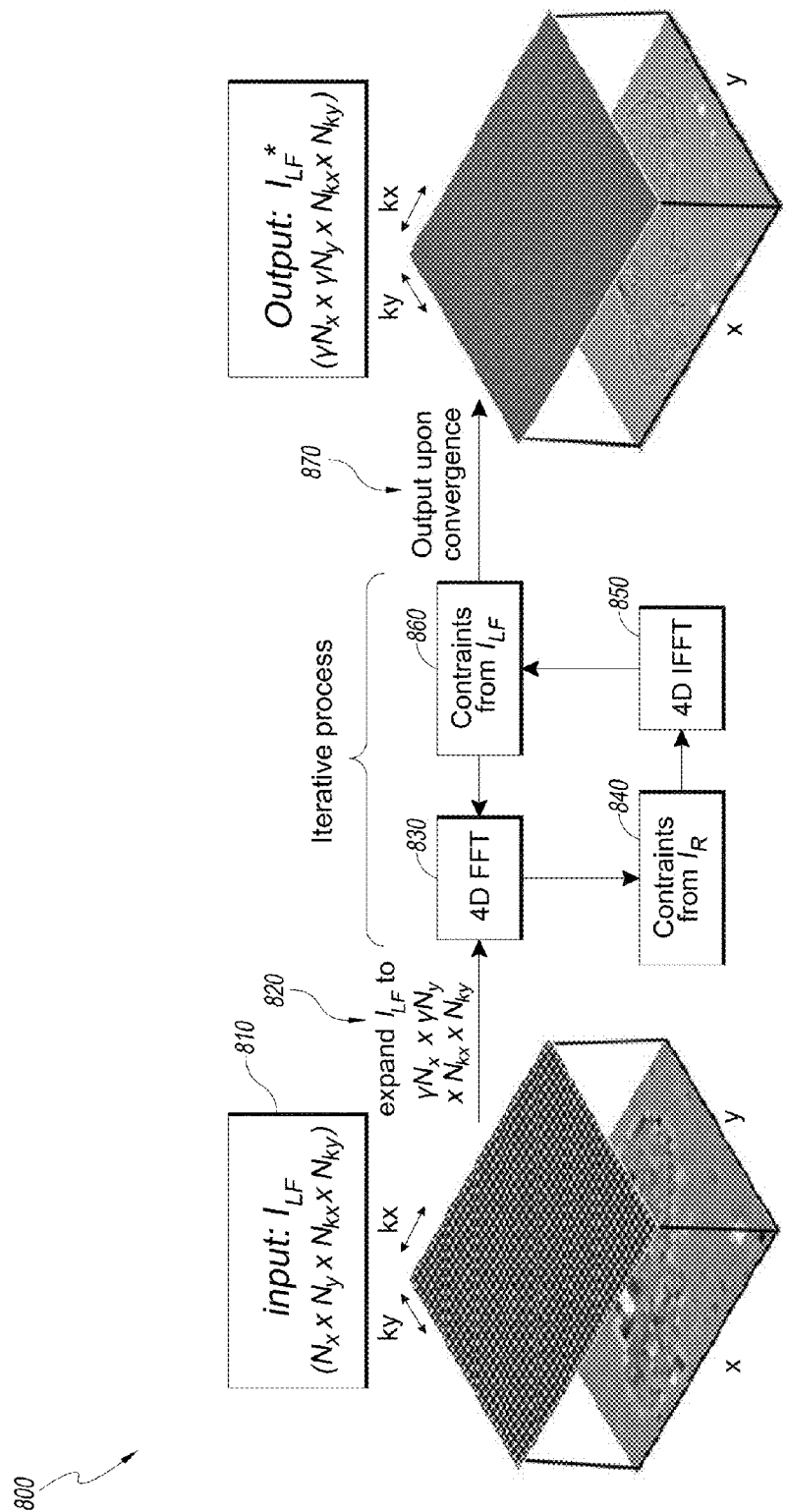
FIG. 8 is a schematic representation of another embodiment of a method for enhancing the resolution of a four-dimensional light-field image using a higher resolution two-dimensional reference image.

FIG. 8 is a schematic representation of another embodiment of a method 800 for enhancing the resolution of a four-dimensional light-field image using a higher resolution two-dimensional reference image. The method 800 is an iterative one in which the information from the high-resolution spatial intensity reference image, $I_R$, is used as a baseline for interpolating local Fourier information in a captured low-resolution light-field image 810, $I_{LF}$.

As discussed herein, the low-resolution four-dimensional light-field image 810, $I_{LF}$, can be up-sampled and interpolated, as illustrated in step 820. After expansion of $I_{LF}$ by a factor of $\gamma$ in the spatial domain, the method 800 then executes a four-dimensional fast Fourier transform (FFT) of the light-field image, $I_{LF}$, at step 830. The method 800 takes advantage of the Fourier slice theorem, which states that, in the Fourier domain, a spatial intensity image of an object space (e.g., captured using a conventional camera with a full lens aperture) is a two-dimensional slice of the four-dimensional light field of the object space. Thus, the Fourier slice theorem allows $I_{LF}$ and $I_R$ to be related to one another in the Fourier domain. Accordingly, at step 840, constraints can be calculated in the Fourier domain from $I_R$ in a manner similar to what has already been disclosed herein with respect to the other methods in the spatial domain. The constraints can be applied to $I_{LF}$ in the Fourier domain or in the spatial domain. In addition, the constraints can be applied in any dimension or projection (though applying them in a two-dimensional plane is typical, as both the real-space image (x, y) and Fourier representation ($k_x$, $k_y$) are generally two-dimensional).

At step 850, a four-dimensional inverse fast Fourier transform is applied to return the light-field image $I_{LF}$ to the spatial domain. Next, at step 860, additional constraints can be applied based upon the estimated high-resolution light-field image itself. For example such constraints can include the reality, non-negativity (light intensity values recorded by an image sensor cannot be negative), and consistency of the fight-field image in the spatial domain. After step 860, the method steps of FFT, constraints, IFFT, and constraints are then repeated iteratively until convergence happens, as illustrated in FIG. 8. Upon convergence, or when the iterative method is otherwise terminated, the result of step 860 can be outputted as a light-field image I*$_{LF}$ having enhanced resolution.

The disclosure thus far has dealt primarily with using relatively higher-resolution spatial (x, y) data to enhance the resolution of (x, y, k$_x$, k$_y$) data. However, the methods disclosed herein can also use relatively higher-resolution spatial frequency (k$_x$, k$_y$) data to enhance the resolution of (x, y, k$_x$, k$_y$) data. For example, as discussed herein, in some embodiments, the reference intensity I$_R$ is a Fourier transform of the object. According to the tenets of Fourier optics, this can occur in the far field of an imaging system or when both the object and image sensor are located substantially one focal length away from the lens. When either of these arrangements are satisfied, the data captured by the image sensor is in the (k$_x$, k$_y$) domain. Since this data can be captured without the use of a lenslet array, it is not subject to the resolution constraints of a lenslet array. Accordingly, relatively high-resolution (k$_x$, k$_y$) data can be obtained using principles of Fourier optics. This data can be used as a reference to enhance the resolution of a (x, y, k$_x$, k$_y$) light-field image using the techniques described herein (e.g., in FIGS. 5-8). This is one technique for enhancing angular resolution of a light-field image using information from a two-dimensional intensity reference image. In a similar manner, any intensity reference I$_R$ measured between near-field (x, y) data and far-field (k$_x$, k$_y$) data can be used to enhance the resolution of (x, y, k$_x$, k$_y$) data.

It should be understood that the methods illustrated in, for example, FIGS. 5-8 are merely examples. Additional methods which combine different features of these methods can also be used. In addition, the methods discussed herein can be applied to color images by using the techniques discussed herein on each separate color channel of such color images. These techniques can also be applied to additional data channels, such as polarization channels.

Figure 9C:
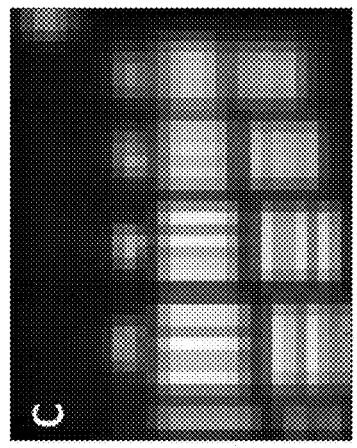
FIGS. 9A-9F are a set of images that compare sample two-dimensional images of a tilted resolution chart that were calculated from a four-dimensional light-field image at various different focal planes.
Figure 9F:
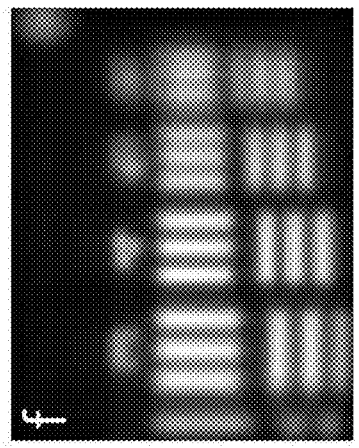
Figure 9B:
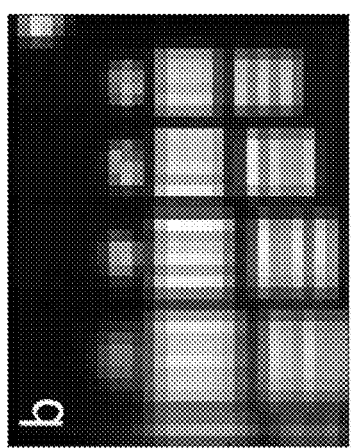
Figure 9E:
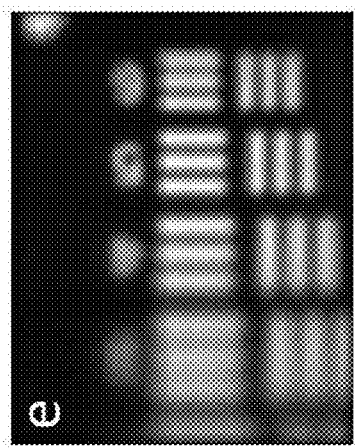
Figure 9A:
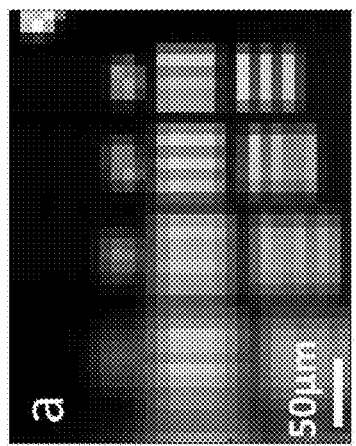

FIGS. 9A-9F are a set of images that compare sample two-dimensional images of a tilted resolution chart that were calculated from a four-dimensional light-field image at various different focal planes. FIGS. 9A-9C on the top row of images do not embody the resolution enhancement techniques described herein, while FIGS. 9D-9F on the bottom row of images do embody such resolution enhancement techniques.

Figure 9D:
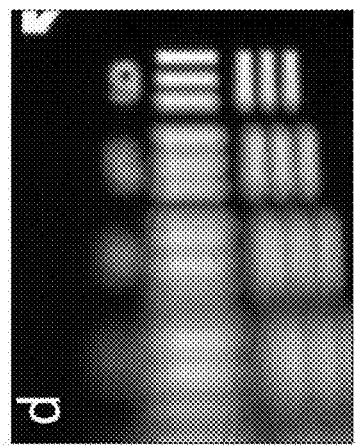

In FIGS. 9A and 9D, the original captured light-field image (FIG. 9A) and the enhanced light-field image (FIG. 9D) are focused at an image plane of 50 μm. In these figures, element 6 of the tilted resolution chart is in focus. Note that the resolution of FIG. 9D is significantly greater than the resolution of FIG. 9A; the number 6 and associated resolution lines can be seen/resolved in the former but not the latter. In FIG. 9B (original captured light-field image) and 9E (enhanced light-field image), the image planes of the light-field images were moved 100 μm to element 5 of the tilted resolution chart. In FIGS. 9C (original captured light-field image) and 9F (enhanced light-field image), the image planes of the light-field images were moved 200 μm to elements 3 and 4 of the tilted resolution chart. In every instance, the resolution of the enhanced light-field image is visibly better than that of the original captured light-field image.

FIGS. 10A-10I are a set of images that compare sample two-dimensional images of a cheek cell that were calculated from a four-dimensional light-field image at various different focal planes. FIGS. 10A-10D on the top row embody the resolution enhancement techniques described herein, while FIGS. 10E-10H on the bottom row do not embody such resolution enhancement techniques. FIG. 10I is a quantitative phase image obtained from FIGS. 10A-10C using the Transport of Intensity Equation.

Each vertical pair of images (i.e., 10A and 10E; 10B and 10F; 10C and 10G; 10D and 10H) represent the enhanced light-field image (on top) and the original captured light-field image (on bottom) focused at different focal depths, which are indicated adjacent the figures. In all cases, the two-dimensional images (on bottom) calculated from the original light-field image are relatively highly pixilated, while the images (on top) which have been enhanced according to the methods described herein have diffraction-limited resolution. Thus, the images (top row) that were calculated from the light field after having been enhanced according to the methods discussed herein provide the best resolution possible with the particular lenses that were used and at the fastest frame rates allowed by the camera. The images (top row) that were calculated from the enhanced light-field images have spatial and angular resolution that is orders of magnitude greater than those (bottom row) from the original light-field image.

The techniques discussed herein, and the high-resolution light-field images resulting therefrom, can be used in many different applications. For example, the disclosed approach will improve any conventional imaging technique, as standard two-dimensional pictures can be supplemented with an additional light-field recording. To name just a few, these applications include medical (e.g., local scattering statistics could be useful in dermatology), military, or commercial imaging; passive three-dimensional topography (since the light-field images contain depth information about the object space); facial, object, or feature recognition; range finding; photography (e.g., knowledge of a focal plane and local light field allows for improved blurring (bokeh) in image processing); more accurate wavefront sensing, which would be useful in astronomy and military applications, among others; more accurate correction of lens aberrations, especially in older lenses; and any other application where depth information about an object space is desirable. Yet another application of the techniques discussed herein is microscopy.

Figure 11:
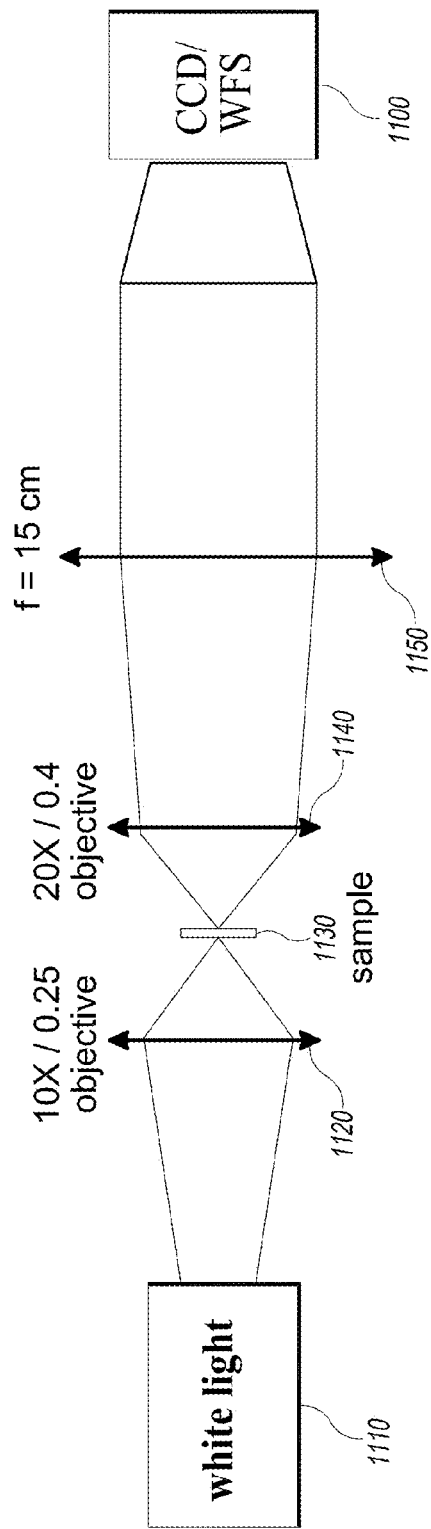
FIG. 11 is a schematic representation of an embodiment of a microscope capable of providing four-dimensional light-field images with enhanced resolution.

FIG. 11 is a schematic representation of an embodiment of a microscope capable of providing four-dimensional light-field images with enhanced resolution. Biology occurs in three dimensions, but the ability to image in 3D has been limited to holography (which requires coherent light that is very sensitive to error), the use of fluorescent markers (which can be toxic), or tomography techniques (which are very slow). Previous light-field methods have been unsuccessful because of the limited resolution.

The techniques discussed herein were tested using the experimental setup shown in FIG. 11. A microscope (e.g., a Nikon Eclipse TE2000-E) was provided. As illustrated in the figure, a warm white light source 1110 from a lamp bulb is concentrated by a 10×/0.25 objective lens. The light then illuminates a sample 1130 and passes through a 20×/0.4 objective lens 1140. The 20× objective 1140 and an imaging lens 1150 (focal length=15 cm) consists a 4f imaging configuration. A full-resolution image is recorded using a CCD camera 1100 (e.g., a Thorlabs DCU224) and then switched to a Shack-Hartmann wavefront sensor (e.g., a Thorlabs WFS150-5C) in order to capture a light-field image. After these two measurements, algorithms discussed herein were performed to reconstruct a super-resolved light-field image. Super-resolved images at different focal planes can be generated numerically by a simple shearing transformation. FIG. 10 shows the computed defocusing of check cells by a single Shack-Hartmann measurement and the proposed method. As illustrated in FIG. 10, there was a significant improvement in both resolution and phase contrast, with the nucleus of each check cell clearly visible. Moreover, once phase-contrast images are obtained, a quantitative phase image can be constructed using the transport-of-intensity equation, as shown in FIG. 10(I).

As nearly all modern microscopes have a port to record images with a (digital) camera, an application of the disclosed approach is as a stand-alone attachment or add-on lenslet array (or other type of light-field camera) for existing cameras, to give 3D capability to existing 2D measurement devices (as illustrated in FIGS. 3 and 4).

In conclusion, a high-resolution light-field imaging method can combine measurements from a coarse-grained Shack-Hartmann sensor and a high-resolution image from a conventional digital camera. With the proposed algorithms, a super-resolved light-field image can be generated computationally. The images obtained from such a light-field data set show a significant improvement in both lateral and axial resolution. This paves the way for a variety of high-resolution three-dimensional imaging applications without requiring optical sectioning or manual scanning.

For purposes of summarizing the disclosure, certain aspects, advantages and features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, methods, etc. described herein. A wide variety of variation is possible. Components, elements, and/or steps may be altered, added, removed, or rearranged.

The devices and methods described herein can advantageously be implemented using, for example, computer software, hardware, firmware, or any combination of software, hardware, and firmware. Software modules can comprise computer executable code, stored in a computer's memory, for performing the functions described herein. In some embodiments, computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. In addition, where methods are described that are, or could be, at least in part carried out by computer software, it should be understood that such methods can be provided on non-transitory computer-readable media (e.g., optical disks such as CDs or DVDs, hard disk drives, flash memories, diskettes, or the like) that, when read by a computer or other processing device, cause it to carry out the method.

While certain embodiments have been explicitly described, other embodiments will become apparent to those of ordinary skill in the art based on this disclosure. Therefore, the scope of the invention is intended to be defined by reference to the claims and not simply with regard to the explicitly described embodiments.

What is claimed is:

1. A camera system comprising:
a wavefront sensor configured to spatially sample wavefronts of light from at least a portion of an object space to obtain the intensity of the wavefronts and associated angular propagation directions of the wavefronts in order to obtain a first light-field image;
an image sensor that is not associated with the wavefront sensor, the image sensor being configured to spatially sample light from the object space to obtain a first intensity reference image, wherein the first intensity reference image is not a light-field image; and
a processor configured to compute a second light-field image from the first light-field image using information from the first intensity reference image, the second light-field image having an enhanced resolution that is greater than that of the first light-field image.

2. The camera system of claim 1, wherein the spatial resolution of the first light-field image is less than that of the first intensity reference image.

3. The camera system of claim 1, wherein the enhanced resolution comprises enhanced spatial resolution.

4. The camera system of claim 1, wherein the enhanced resolution comprises enhanced angular resolution.

5. The camera system of claim 1, wherein the processor is configured to up-sample the first light-field image to correspond to the spatial resolution of the first intensity reference image, and to perform interpolation on the up-sampled first light-field image.

6. The camera system of claim 5, wherein the processor is configured to combine angular propagation directions for one or more spatial points in order to obtain a two-dimensional projection of the first light-field image.

7. The camera system of claim 6, wherein the processor is configured to determine one or more constraints from the first intensity reference image, the one or more constraints being used to determine the second light-field image.

8. The camera system of claim 7, wherein the processor is configured to transform the first light-field image into the frequency domain prior to determining the one or more constraints from the first intensity reference image.

9. A camera system comprising:
an image sensor configured to spatially sample light from an object space to obtain a first intensity reference image;
a wavefront sensor configured to spatially sample wavefronts of light from at least a portion of the object space to obtain the intensity of the wavefronts and associated angular propagation directions of the wavefronts in order to obtain a first light-field image; and
a processor configured to compute a second light-field image using information from the first intensity reference image, the second light-field image having an enhanced resolution that is greater than that of the first light-field image,
wherein the processor is further configured to up-sample the first light-field image to correspond to the spatial resolution of the first intensity reference image, and to perform interpolation on the up-sampled first light-field image, wherein the processor is further configured to combine angular propagation directions for one or more spatial points in order to obtain a two-dimensional projection of the first light-field image, wherein the processor is further configured to determine one or more constraints from the first intensity reference image, the one or more constraints being used to determine the second light-field image, and wherein the one or more constraints comprise one or more coefficients that relate the two-dimensional projection of the first light-field image to the first intensity reference image.

10. The camera system of claim 9, wherein the processor is configured to apply the one or more constraints to the up-sampled and interpolated first light-field image.

11. The camera system of claim 1, wherein the processor is configured to perform a registration operation to reduce any difference between respective frames of reference of the first intensity reference image and the first light-field image.

12. The camera system of claim 1, wherein the processor is configured to determine one or more image characteristics from the first intensity reference image and the first light-field image; to determine an objective cost function using the one or more image characteristics; and to iteratively adjust an estimate of the second light-field image based on the objective cost function in order to obtain the second light-field image.

13. The camera system of claim 12, wherein the image characteristics comprise differences between the first light-field image and an estimate of the second light-field image; or differences between the intensity reference image and a two-dimensional projection of the estimate of the second light-field image; or the smoothness of the estimate of the second light-field image.

14. The camera system of claim 1, wherein the image sensor comprises one or more image sensors and the one or more image sensors are configured to obtain a set of intensity reference images, the set of intensity reference images comprising at least the first intensity reference image and a second intensity reference image, the second intensity reference image differing in at least one respect from the first intensity reference image; and wherein the processor is configured to compute the second light-field image using information from the set of intensity reference images.

15. A camera system comprising:
an image sensor configured to spatially sample light from an object space to obtain a first intensity reference image;
a wavefront sensor configured to spatially sample wavefronts of light from at least a portion of the object space to obtain the intensity of the wavefronts and associated angular propagation directions of the wavefronts in order to obtain a first light-field image; and
a processor configured to compute a second light-field image using information from the first intensity reference image, the second light-field image having an enhanced resolution that is greater than that of the first light-field image,
wherein the image sensor comprises one or more image sensors and the one or more image sensors are configured to obtain a set of intensity reference images, the set of intensity reference images comprising at least the first intensity reference image and a second intensity reference image, the second intensity reference image differing in at least one respect from the first intensity reference image,
wherein the processor is further configured to compute the second light-field image using information from the set of intensity reference images, and
wherein the first intensity reference image and the second intensity reference image comprise different respective focal planes.

16. The camera system of claim 1, wherein the first intensity reference image satisfies an imaging condition for a selected object within the object space, or wherein the first intensity reference image comprises a Fourier transform.

17. The camera system of claim 1, wherein the processor is configured to iteratively compute the second light-field image.

18. The camera system of claim 1, wherein the first intensity reference image and the first light-field image are obtained simultaneously.

19. The camera system of claim 1, wherein the first intensity reference image and the first light-field image are obtained at different times.

20. The camera system of claim 1, wherein the image sensor and the wavefront sensor comprise separate devices.

21. The camera system of claim 20, wherein a light-field camera comprising the wavefront sensor is configured to be attached to a camera comprising the image sensor.

22. The camera system of claim 1, further comprising a beam splitter, the beam splitter being arranged so as to combine the optical paths of the image sensor and the wavefront sensor.

23. The camera system of claim 1, wherein the wavefront sensor comprises an array of lenslets or pinhole apertures.

24. A method comprising:
receiving a first light-field image captured by a wavefront sensor, the first light-field image comprising spatial samples of wavefronts of light from at least a portion of an object space that specify the intensity of the wavefronts and associated angular propagation directions of the wavefronts;
receiving a first intensity reference image of the object space captured by an image sensor that is not associated with the wavefront sensor, wherein the first intensity reference image is not a light-field image; and
computing, using a processor, a second light-field image from the first light-field image using information from the first intensity reference image, the second light-field image having an enhanced resolution that is greater than that of the first light-field image.

25. The method of claim 24, wherein the spatial resolution of the first light-field image is less than that of the first intensity reference image.

26. The method of claim 24, wherein the enhanced resolution comprises enhanced spatial resolution or enhanced angular resolution.

27. The method of claim 24, further comprising up-sampling the first light-field image to correspond to the spatial resolution of the first intensity reference image, and performing interpolation on the up-sampled first light-field image.

28. The method of claim 27, further comprising combining angular propagation directions for one or more spatial points in order to obtain a two-dimensional projection of the first light-field image.

29. A method comprising:
receiving a first intensity reference image of an object space captured by an image sensor;

receiving a first light-field image captured by a wavefront sensor, the first light-field image comprising spatial samples of wavefronts of light from at least a portion of the object space that specify the intensity of the wavefronts and associated angular propagation directions of the wavefronts; and computing, using a processor, a second light-field image using information from the first intensity reference image, the second light-field image having an enhanced resolution that is greater than that of the first light-field image, wherein the method further comprises up-sampling the first light-field image to correspond to the spatial resolution of the first intensity reference image, and performing interpolation on the up-sampled first light-field image, wherein the method further comprises combining angular propagation directions for one or more spatial points in order to obtain a two-dimensional projection of the first light-field image, wherein the method further comprises determining one or more constraints from the first intensity reference image, the one or more constraints being used to determine the second light-field image; and applying the one or more constraints to the up-sampled and interpolated first light-field image.

30. The method of claim 24, further comprising performing a registration operation to reduce any difference between respective frames of reference of the first intensity reference image and the first light-field image.

31. The method of claim 24, further comprising determining one or more image characteristics from the first intensity reference image and the first light-field image; determining an objective cost function using the one or more image characteristics; and iteratively adjusting an estimate of the second light-field image based on the objective cost function in order to obtain the second light-field image.

32. The method of claim 31, wherein the image characteristics comprise differences between the first light-field image and an estimate of the second light-field image; or differences between the intensity reference image and a two-dimensional projection of the estimate of the second light-field image; or the smoothness of the estimate of the second light-field image.

33. The method of claim 24, further comprising obtaining a set of intensity reference images, the set of intensity reference images comprising at least the first intensity reference image and a second intensity reference image, the second intensity reference image differing in at least one respect from the first intensity reference image; and wherein the processor is configured to compute the second light-field image using information from the set of intensity reference images.

34. A method comprising:
receiving a first intensity reference image of an object space captured by an image sensor;
receiving a first light-field image captured by a wavefront sensor, the first light-field image comprising spatial samples of wavefronts of light from at least a portion of the object space that specify the intensity of the wavefronts and associated angular propagation directions of the wavefronts; and
computing, using a processor, a second light-field image using information from the first intensity reference image, the second light-field image having an enhanced resolution that is greater than that of the first light-field image,
wherein the method further comprises obtaining a set of intensity reference images, the set of intensity reference images comprising at least the first intensity reference image and a second intensity reference image, the second intensity reference image differing in at least one respect from the first intensity reference image; and
wherein the processor is configured to compute the second light-field image using information from the set of intensity reference images, and
wherein the first intensity reference image and the second intensity reference image comprise different respective focal planes.

35. The method of claim 24, wherein the first intensity reference image and the first light-field image are obtained simultaneously.

36. A non-transitory computer-readable medium that, when read by a computer, causes the computer to perform a method comprising:
receiving a first light-field image captured by a wavefront sensor, the first light-field image comprising spatial samples of wavefronts of light from at least a portion of an object space that specify the intensity of the wavefronts and associated angular propagation directions of the wavefronts;
receiving a first intensity reference image of the object space captured by an image sensor that is not associated with the wavefront sensor, wherein the first intensity reference image is not a light-field image; and
computing, using a processor, a second light-field image from the first light-field image using information from the first intensity reference image, the second light-field image having an enhanced resolution that is greater than that of the first light-field image.

* * * * *

UNITED STATES PATENT AND TRADEMARK OFFICE
CERTIFICATE OF CORRECTION

PATENT NO. : 9,679,360 B2
APPLICATION NO. : 14/274600
DATED : June 13, 2017
INVENTOR(S) : Jason W. Fleischer It is certified that error appears in the above-identified patent and that said Letters Patent is hereby corrected as shown below:

In the Drawings

Sheet 8 of 11 (FIG. 8, Reference 840) at Line 1, change "Contraints" to --Constraints--.

Sheet 8 of 11 (FIG. 8, Reference 860) at Line 1, change "Contraints" to --Constraints--.

In the Specification

In Column 1 at Line 21, change "Sponsored" to --Scientific--.

In Column 10 at Line 38, change "$I_{IF}$." to --$I_{LF}$.--.

In Column 14 at Line 65, change "fight-field" to --light-field--.

In Column 15 at Line 53, change "FIG." to --FIGS.--.

Signed and Sealed this
Third Day of October, 2017

Joseph Matal
*Performing the Functions and Duties of the*
*Under Secretary of Commerce for Intellectual Property and*
*Director of the United States Patent and Trademark Office*